United States Patent
Nakagawa et al.

[11] Patent Number: 6,004,477
[45] Date of Patent: Dec. 21, 1999

[54] OXYGEN ABSORPTION COMPOSITION

[75] Inventors: Kazumoto Nakagawa; Tatsuo Iwai, both of Tokyo; Takayuki Watanabe, Chiba-ken; Nahomi Abe, Tokyo; Tomoharu Himeshima, Chiba-ken, all of Japan

[73] Assignee: Mitsubishi Gas Chemical Company, Inc., Tokyo, Japan

[21] Appl. No.: 08/946,731

[22] Filed: Oct. 8, 1997

[30] Foreign Application Priority Data

Oct. 14, 1996 [JP] Japan .................................. 8-270856
Oct. 30, 1996 [JP] Japan .................................. 8-288390

[51] Int. Cl.$^6$ .................................................. C09K 15/04
[52] U.S. Cl. .................... 252/188.28; 252/184; 252/194; 252/189; 426/322; 426/323; 426/124
[58] Field of Search ............................... 252/188.28, 184, 252/189, 192, 194; 426/124, 541, 321, 322, 323

[56] References Cited

U.S. PATENT DOCUMENTS

| | | | |
|---|---|---|---|
| 4,604,321 | 8/1986 | Okahara et al. ...................... | 428/319.9 |
| 4,908,151 | 3/1990 | Inoue et al. ......................... | 252/188.28 |
| 5,143,763 | 9/1992 | Yamada et al. ....................... | 428/36.2 |
| 5,286,407 | 2/1994 | Inoue et al. ......................... | 252/188.28 |
| 5,350,622 | 9/1994 | Speer et al. .......................... | 428/215 |
| 5,378,428 | 1/1995 | Inoue et al. ......................... | 422/9 |
| 5,510,166 | 4/1996 | Inoue et al. ......................... | 428/76 |
| 5,605,996 | 2/1997 | Chun et al. .......................... | 526/340 |
| 5,725,795 | 3/1998 | Kashiba ............................... | 252/188.28 |

FOREIGN PATENT DOCUMENTS 454437 10/1991 European Pat. Off. .

OTHER PUBLICATIONS

Japanese Patent Abstract of JP 08 193001, vol. 96, No. 11, Watanabe Tetsushi, Jul. 1996.
Japanese Patent Abstract of JP 56 155641, vol. 6, No. 40 (C–094), Kondo Yukio, Dec. 1981.
Japanese Patent Abstract of JP 04 187238, vol. 16, No. 509 (C–0997), Sato Yukie, Nov. 1990.

*Primary Examiner*—Joseph D. Anthony
*Attorney, Agent, or Firm*—Frishauf, Holtz, Goodman, Langer & Chick, P.C.

[57] ABSTRACT

An oxygen absorption composition without requiring moisture in oxygen absorption which comprises an oxygen absorbent comprising, as a principal component, an oligomer in liquid form having an unsaturated group, a number-average molecular weight in the range of 150 to 4,000 and a viscosity in the range of 100 to 4,000 cP such as butadiene oligomer in liquid form and an oxygen absorption-accelerating substance, being supported on a carrier; and an other gas absorbent. The principal component may be replaced with an oligomer in liquid form having an unsaturated group and being incorporated with an oxygen-unabsorptive diluent to adjust the viscosity of the mixture to 10 to 4,000 cP. The composition is enhanced in oxygen absorption capability in every preservation atmosphere from a low humidity to an intermediate and high humidity, easily producible, minimized in gas generation after oxygen absorption and almost free from odor.

24 Claims, No Drawings

OXYGEN ABSORPTION COMPOSITION

BACKGROUND OF THE INVENTION

1. Field of the Invention

The present invention relates to an oxygen abosorption composition which has functions of absorbing oxygen, inorganic gases, organic gases, moisture in some case and the like without requiring moisture in absorbing oxygen, and which is used for the preservation of metallic part items, electronic part items, electric part items, precision part items, magnetic/optical part items, ornamental jewellery, weapons, aircrafts, automobiles, glass, rubber products, photographic films, foods, pharmaceuticals pressed dried flowers, paintings, antique documents, unearthed articles from ruins, and the like items and matters. In addition, the present invention pertains to an oxygen absorption composition which is suppressed in heat generation accompanying the reaction with oxygen and also is enhanced in safety in the case of its disposal or transportation.

2. Description of Ralated Arts

There have heretofore been known, as an oxygen absorbent, a metallic powder, catechol, ascorbic acid and the like each as a principal component. However, since the above-mentioned oxygen absorbents require moisture in absorbing oxygen, the oxygen absorption system needs to be highly humid, thereby limiting the object of preservation in the oxygen absorption system. On the other hand, there is proposed in Japanese Patent Application Laid-Open No. 29741/1992 (Heisei-4), a composition as an oxygen absorption composition which does not require moisture in the case of oxygen absorption. There is disclosed therein that an unsaturated aliphatic hydrocarbon and/or an unsaturated aliphatic compound are used as principal components. According to the working examples disclosed therein, there are used unsaturated fatty acids or fats and oils comprising unsaturated fatty acids as unsaturated aliphatic compounds, and polymers in liquid form of hydrocarbons having unsaturated groups as unsaturated aliphatic hydrocarbon. However, the unsaturated fatty acids or fats and oils comprising unsaturated fatty acids involve the problems in practical application that a large amount of gases are generated after the absorption of oxygen and that the gases are malodorous. On the other hand, the polymers in liquid form of hydrocarbons having unsaturated groups involve the problems that the liquid hydrocarbons are difficult to be supported on a carrier at the time of production because of their usually high viscosity. There is described that the polymers in liquid form of hydrocarbons having unsaturated groups are mixed with unsaturated fatty acids or fats and oils comprising unsaturated fatty acids to bring the resultant mixture to a low-viscosity principal component. Nevertheless, the problem still remains unsolved in practical application thereof in that a large amount of gases are generated causing marked malodor because of the unsaturated fatty acids or fats and oils comprising the unsaturated fatty acids that are contained in the resultant mixture, thus necessitating a large amount of a gas absorbent to absorb the generated gas. In addition, there is proposed in Japanese Patent Application Laid-Open NO. 115776/1993 (Heisei-5), a deoxidizing film comprising an ethylenically unsaturated hydrocarbon and a transition metal as a catalyst. In general, however, the above-proposed deoxidizing film involves the problem that a considerably long time is required for completing deoxidization.

In general, many oxygen absorbents are accompanied by heat generation at the time of deoxidization (oxygen absorption). Thus, when such an oxygen absorbent is allowed to stand in the atmosphere, the temperature thereof is suddenly raised as the case may be, whereby delicate care is often made necessary in storage or disposal thereof, especially in the case of accumulation of large amount of oxygen absorbents.

SUMMARY OF THE INVENTION

It is an object of the present invention to provide an oxygen absorption composition which is imparted with a high oxygen absorbing capability in a preservation atmosphere from low to intermediate and high humidity, easily producible, and minimized in the generation of gases after oxygen absorption and also in odor and which does not require moisture in oxygen absorption.

It is another object of the present invention to provide an oxygen absorbent (oxygen absorption composition) which is compact and minimized in the rise of temperature of the oxygen absorbent even when it is accumulated in a large amount in an atmosphere of air under a thermally insulated condition.

Other objects of the present invention will be obvious from the text of the specification hereinafter disclosed.

It has been found, in order to achieve the above-mentioned objects, that it is favorable and suitable to use, as the principal component of the oxygen absorption composition, an ① oligomer in the form of liquid which has unsaturated groups, a number-average molecular weight in the range of 150 to 4,000 and a viscosity in the range of 100 to 4,000 cP (centipoise), or an ② oligomer in the form of liquid which has an unsaturated group and is incorporated with an oxygen-unabsorptive diluent to adjust the viscosity of the resultant mixture to 10 to 4,000 cP. It has also been found that the heat generation is effectively suppressed by adding to the oxygen absorption composition, a solid having a heat of fusion of at least 190 mJ/mg and a melting point in the range of 80 to 150° C. The present invention has been accomplished on the basis of the foregoing finding and information.

That is to say, the first aspect of the present invention relates to an oxygen absorption composition without requiring moisture in oxygen absorption which comprises an oxygen absorbent comprising, as a principal component, an oligomer in liquid form having an unsaturated group, a number-average molecular weight in the range of 150 to 4,000 and a viscosity in the range of 100 to 4,000 cP and an oxygen absorption-accelerating substance, said oligomer and said substance being supported on a carrier; and an other gas absorbent.

The second aspect of the present invention relates to an oxygen absorption composition without requiring moisture in oxygen absorption which comprises an oxygen absorbent comprising as a principal component, an oligomer in liquid form having an unsaturated group and being incorporated with an oxygen-unabsorptive diluent to adjust the viscosity of the resultant mixture to 10 to 4,000 cP and an oxygen absorption-accelerating substance, said oligomer and said substance being supported on a carrier; and an other gas absorbent.

The third aspect of the present invention relates to an oxygen absorption composition which further comprises a dehumidifying agent.

The fourth aspect of the present invention relates to an oxygen absorption composition which further comprises a moisture conditioning agent.

The fifth aspect of the present invention relates to an oxygen absorption composition which further comprises a solid having a heat of fusion of at least 190 mJ/mg and a melting point in the range of 80 to 150° C.

DESCRIPTION OF PREFERRED EMBODIMENTS

The oxygen absorption composition according to the present invention serves for the purpose of suppressing the deterioration of an article to be preserved by placing the article to be preserved in a hermetically sealed environment substantially free from oxygen, an inorganic gas, an organic gas and, as the case may be moisture through the accommodation of the articles to be preserved along with this oxygen absorption composition in a vessel with gas barrier properties.

The oligomer in liquid form having an unsaturated group as the principal component of the oxygen absorption composition according to the present invention needs to be easily producible, imparted with a high oxygen absorbing capability, and minimized in the generation of gases after oxygen absorption and also in odor. In order to meet the aforesaid requirements, said oligomer is preferably ① a low viscous compound from the viewpoints of production and oxygen absorbing capability, and is preferably ② a high molecular compound from the standpoints of decreasing gas generation. In order to meet the above-mentioned conflicting requirements ① and ②, it is desirable to employ, as the principal component, an oligomer in liquid form which contains an unsaturated group and has a number-average molecular weight of 150 to 4,000 (as measured by Vapor pressure osmosis method), preferably 300 to 3,000 more preferably 500 to 2,500 and a viscosity of 100 to 4,000 cP (as measured by a Brookfield viscometer manufactured by Tohki Sangyo Co., Ltd.), preferably 150 to 2,000 cP, more preferably 200 to 1,000 cP. Alternatively, it is also desirable from the aspect of production and performance to use, as the principal component, a mixture formed by adding an oxygen-unabsorptive diluent to an oligomer in liquid form which contains an unsaturated group to adjust the viscosity of the resultant mixture to 10 to 4,000 cP, preferably 20 to 2,000 cP, more preferably 30 to 1,000 cP.

In the case of constituting the principal component without the use of a diluent, there exists the problem with said oligomer as the principal component having a number-average molecular weight of less than 150 or a viscosity of less than 100 cP in that a high content of low molecular weight components leads to a large amount of gases generated after oxygen absorption and the like problems. On the other hand, the oligomer as the principal component having a number-average molecular weight of more than 4,000 or a viscosity of more than 4,000 cP is not practical because of the problems of low oxygen absorption rate due to the reasons that ① the oligomer is difficult to support on a carrier ② the diffusion rate of oxygen in the principal component is low, ③ sufficient surface area is not obtained in the case of the oligomer being supported on a carrier, etc.

In the case of constituting the principal component by adding an oxygen-unabsorptive diluent to the oligomer in the form of liquid having an unsaturated group for the purpose of decreasing the viscosity of the resultant mixture to 10 to 4,000 cP, it is disadvantageous and unfavorable to decrease the viscosity to less than 10 cP from the aspects of expenditure and the need of using a large amount of the oxygen absorbent.

Examples of the oligomer in liquid form having an unsaturated group to be used in the composition of the present invention include butadiene oligomer in liquid form, isoprene oligomer in liquid form, acetylene oligomer in liquid form, styrene-butadiene copolymer in liquid form, acrylonitrile-butadiene copolymer in liquid form, chloroprene oligomer in liquid form, unsaturated polyester resin in liquid form and natural rubber. Of these, the aforesaid butadiene oligomer in liquid form is more preferable from the viewpoint of expenditure, the amount of gases generated after oxygen absorption and odor. Any of these oligomers is not always required to be a single substance, but may be a mixture of at least two species, or a copolymer of at least two species. It is permissible in this case to accept small amounts of impurities such as a solvent mixing thereinto at the time of production to a reasonable extent. Moreover, the oligomer in the form of a liquid having an unsaturated group to be used in the composition of the present invention may have a substituent other than the foregoing unsaturated group which substituent is exemplified by a halogen group, a hydroxyl group, a carbonyl group, an ether group, a carboxyl group and an ester. For example, the oligomer may be substituted with a functional group such as an alicyclic hydrocarbon group, an aromatic hydrocarbon group, a hydroperoxy group, an epoxy group, an oxo group, a hydroxymethyl group, an acyl group, an amino group, an imino group, a nitrilo group, a nitro group, a nitroso group, an amide group, an imide group, a cyano group, an isocyano group, a cyanato group, an isocyanato group, a diazo group, a hydrazino group, an azo group and a heterocylic group.

The butadiene oligomer in liquid form to be used in the composition of the present invention, which does not contain a side chain, is preferably a butadiene oligomer in liquid form having at least 65% of 1,4-bonding in molecular structure, and thus having a low viscosity in particular among butadine oligomers in liquid form having almost the same molecular weight. The bonding in molecular structure was determined by nuclear magnetic resonance analysis. Of the butadiene oligomers in liquid form having 1,4-bonding and almost same molecular weight, it is more preferable to use a butadiene oligomer in liquid form having at least 65% of 1,4-cis bond in molecular structure, and thus having a lower viscosity. The amount of gases such as hydrogen, carbon monoxide, carbon dioxide and methane that are generated from a butadiene oligomer in liquid form having 1,2-bonding, is more than the amount of said gases generated from a butadiene oligomer in liquid form having 1,4-bonding.

It is desirable that the oxygen-unabsorptive diluent to be used in the composition of the present invention, meets the requirements including ① being free from a functional group liable to be oxidized such as an unsaturated group, a hydroxyl group and an aldehyde group; ② being miscible with a hydrocarbon oligomer in liquid form having an unsaturated group; and ③ being at least one organic compound capable of decreasing the viscosity of an oligomer in liquid form having an unsaturated group. The oxygen-unabsorptive diluent is not specifically limited insofar as the above-mentioned requirements are satisfied, but is exemplified by a straight chain saturated hydrocarbon such as decane, tridecane, tetradecane and n-paraffin, an alkylnaphthene such as liquid paraffin, and a naphthenic acid. The oxygen-unabsorptive diluent is not always required to be a single substance, but may be a mixture of at least two species. In the case where an oxygen-absorptive compound such as an unsaturated fatty acid compound, an animal oil, a vegetable oil and an alcohol, is used as a diluent to decrease the viscosity of the present composition, the amounts of the gases unfavorably increase after oxygen absorption, thus causing malodor. The proportion of the oxygen-unabsorptive diluent to the oligomer in liquid form having an unsaturated group is not specifically limited, but it is preferably at most 1,000 parts by weight per 100 parts by weight of the oligomer in liquid form having an unsaturated group. An excessively increased use in the amount of the oxygen-unabsorptive diluent will bring about such problems as that of an increase in manufacturing cost and also in the amount of the oxygen absorbent to be used. Accordingly, the amount of the diluent to be used needs to be suitably selected.

The oxygen absorption-accelerating substance to be used in the composition of the present invention is exemplified by a metal compound which accelerates the oxidation of an organic compound and a radical initiator. Examples of preferable metal compounds include a salt of a transition metal such as Cu, Fe, Co, Ni, Cr and Mn, of which is more preferable a salt of a transition metal including Mn and Fe in view of oxygen absorption capacity as well as safety. Examples of preferable salts of transition metals include an inorganic salt such as a sulfate, chloride and nitrate; an organic salt such as a fatty acid salt, an acetylacetone metal salt; and an alkyl-metal salt each of a transition metal. Examples of the radical initiators include catechols, azo compounds such as 2,2-azobis(isobutyronitrile) and peroxide such as benzoyl peroxide. It is preferable that the oxygen absorption-accelerating substance be uniformly blended with the principal component after mixing.

The carrier substance to be used in the composition of the present invention is not specifically limited insofar as it has a large specific surface area and is capable of extending the area of contact between oxygen and the principal component containing the oxygen absorption-accelerating substance. Examples of the aforesaid carrier substance include paper made of natural pulp, synthetic paper made of synthetic pulp, nonwoven fabric, porous films, silica-gel, alumina, activated carbon, synthetic zeolite such as molecular sieve, natural zeolite such as mordenite and erionite, and clay minerals such as perlite, activated clay and diatomaceous earth. It is also a practical usage to select the carrier substance from the substances that are selected as a gas absorbent or a dehumidifying agent to impart gas absorbing or dehumidifying capability to the carrier substance.

As mentioned hereinbefore, the oxygen absorption composition according to the present invention comprises the above-mentioned oxygen absorbent and an other gas absorbent. The aforesaid other gas absorbent absorbs principally gases other than oxygen, and in more detail, it is a substance which absorbs, prior to the oxygen absorption reaction with the principal component of oligomer in liquid form having an unsaturated group, highly volatile low molecular weight substances that are contained in the oligomer itself; gaseous components formed in oxygen absorption reaction such as hydrogen, carbon monoxide, carbon dioxide, hydrocarbons, aldehydes, ketones and carboxylic acids; and corrosive gaseous components in an atmosphere to be hermetically sealed such as hydrogen sulfide and ammonia. The other gas absorbent is not specifically limited inasmuch as it achieves the above-mentioned object, and it is exemplified by aluminum oxide; synthetic zeolite typified by molecular sieve; natural zeolite such as mordenite and erionite; clay minerals such as perlite and activated clay; porous glass such as silica-gel; activated carbon series such as activated carbon, activated carbon fiber, molecular sieving carbon and bone charcoal; oxides of an alkaline earth metal such as calcium oxide, barium oxide and magnesium oxide; hydroxides, such as sodium hydroxide, potassium hydroxide and slaked lime; and other absorbents such as magnesium silicate, aluminum silicate, high molecular adsorbent, sodium sulfate, sodium carbonate, potassium carbonate, soda lime, Ascarite, organic acid salts and organic amines. It is also a practical usage to select the other gas absorbent from the substances that are selected as a carrier for the principal component or a dehumidifying agent to impart gas absorptivity thereto. In this case, it is made unnecessary to freshly incorporate an other gas absorbent. Any of the above-exemplified other gas absorbent is not always required to be a single substance, but may be a mixture of at least two species.

A dehumidifying agent may be optionally added to the oxygen absorption composition of the present invention depending upon an article to be stored. For example, in the case of preserving an article which rejects moisture, e.g. preserving a metallic product, it is preferable to add a dehumidifying agent in a positive manner to substantially remove moisture. The dehumidifying agent to be used therefor may be selected from dehumidifying agents for a general purpose including silica-gel, aluminum oxide, synthetic zeolite typified by molecular sieves, natural zeolite such as mordenite and erionite, clay minerals such as perlite, acid clay and activated clay, porous glass, magnesium silicate, aluminum silicate, high molecular adsorbent, activated carbon, activated carbon fiber, molecular sieving carbon, bone charcoal, calcium oxide, calcium sulfate, calcium chloride, calcium bromide, barium oxide, barium bromide, barium perchlorate, magnesium chloride, magnesium oxide, magnesium sulfate, magnesium perchlorate, aluminum sulfate, sodium sulfate, sodium hydroxide, sodium carbonate, potassium carbonate, potassium hydroxide, zinc chloride, zinc bromide and lithium perchlorate. It is also a practical usage to select the dehumidifying agent from the substances that are selected as a carrier for the principal component or a gas absorbent to impart dehumidifying capability thereto. In this case, there is not always a need for freshly adding a dehumidifying agent. Any of the above-exemplified dehumidifying agents is not necessarily required to be a single substance, but may be a mixture of at least two species.

In the case of preserving an article to be favorably preserved at a relative humidity of 40 to 60% such as paper, books, pigments, dyes, wood, antique documents, unearthed articles, fibers and resins by the use of the oxygen absorption composition of the present invention, a moisture conditioning agent may be added to the composition in a positive manner. The moisture conditioning agent to be used therefor is not specifically limited inasmuch as it is capable of conditioning the relative humidity in a hermetically sealed atmosphere to a prescribed level, but it is exemplified by a product formed by impregnating cotton, paper or diatomaceous earth with a saturated aqueous solution of a salt. Examples of the salt include barium chloride dehydrate, potassium acetate, sodium acetate trihydrate, calcium chloride hexahydrate, calcium nitrate tetrahydrate, calcium sulfate pentahydrate, chromium trioxide, oxalic acid dihydrate, phosphoric acid semihydrate, potassium bromide, potassium fluoride, potassium hydrogen sulfate, potassium iodide, potassium nitrite, potassium carbonate dihydrate, potassium perchromate, lithium chloride monohydrate, magnesium acetate tetrahydrate, magnesium nitrate hexahydrate, ammonium chloride, ammonium sulfate, sodium bromide, sodium bromide dihydrate, sodium bromate, sodium chlorate, sodium fluoride, sodium hydrogen sulfate monohydrate, sodium iodide, sodium nitrite, sodium carbonate decahydrate, sodium dichromate dihydrate, sodium sulfate decahydrate, lead nitrate, lead nitrate hexahydrate, and zinc sulfate heptahydrate. In addition thereto, the moisture conditioning agent is also exemplified by a product formed by impregnating cotton, paper or diatomaceous earth with a mixed solution of water and glycerol; paper, cotton, leather, rubber, wood and charcoal each containing moisture of equilibrium water content. In the case where the object of preservation such as paper, cotton, leather, rubber, wood, charcoal or the like is imparted with moisture conditioning function, there is not always a need for adding a moisture conditioning agent in particular.

The proportion of each of the components in the oxygen absorption composition of the invention is suitably selected in accordance with the kind or type of the substance to be used. However, the oxygen absorption-accelerating substance is in the range of 0.01 to 40 parts by weight based on 100 parts by weight of the principal component, while the carrier substance is in the range of 1 to 1,000 parts by weight based on the same in both the case of using, as a principal component of the oxygen absorbent, the oligomer in liquid form having an unsaturated group, a number-average molecular weight in the range of 150 to 4,000 and a viscosity in the range of 100 to 4,000 cP and the case of using, as a principal component thereof, the oligomer in liquid form having an unsaturated group and being incorporated with an oxygen-unabsorptive diluent to adjust the viscosity of the resultant mixture to 10 to 4,000 cP.

The amount of the oxygen absorbent to be used in the oxygen absorption composition of the present invention is the amount necessary for maintaining the preservation atmosphere under a substantially oxygen-free condition for at least a preservation period, and is preferably 1.1 to 10 times the aforesaid amount. The term "substantially oxygen-free condition" as mentioned herein is meant to be an oxygen concentration of 5% or lower, preferably 1% or lower, more preferably 0.1% or lower.

The amount of the other gas absorbent to be used in the oxygen absorption composition of the present invention varies depending upon the absorption capacity of said absorbent. It is preferable that the necessary amount be selected so that the gases contained in the principal component prior to oxygen absorption as well as the gases generated during and after the oxygen absorption can be substantially removed. Specifically, it is in the range of 1 to 5,000 parts by weight based on 100 parts by weight of the principal component.

In the case where the dehumidifying agent is used in the present invention, the amount to be used is an amount capable of substantially removing the moisture at least in the space volume inside the hermetically sealed vessel having gas barrier properties. It is preferably 1.1 to 500 times the aforesaid amount, and is suitably selected in accordance with the gas barrier performance of the hermetically sealed vessel having gas barrier properties. The term "substantially removing the moisture" as mentioned herein is meant to be a relative humidity of 10% or lower, preferably 5% or lower, more preferably 1% or lower.

In the case where the moisture conditioning agent is used in the present invention, the amount to be used is at least an amount necessary for maintaining the relative humidity in the hermetically sealed vessel having gas barrier properties at a prescribed level for each of the articles to be preserved. Preferably it is 1.1 to 500 times the aforesaid amount.

The present invention further provides an oxygen absorption composition capable of suppressing heat generation by adding a solid which has a heat of fusion of at least 190 mJ/mg and a melting point in the range of 80 to 150° C. to the oxygen absorption composition comprising the above-described oxygen absorbent, other gas absorbent, and as desired, the dehumidifying agent and moisture conditioning agent. It is also effective to directly add the above-mentioned solid to the oxygen absorbent. The solid to be added thereto is exemplified by a variety of species, provided that it has a heat of fusion of at least 190 mJ/mg and a melting point in the range of 80 to 150° C.

In general, the capability of suppressing heat generation increases with an increase in the total heat of fusion (product of heat of fusion per unit weight) of the solid in question. However, when comparing a solid having a large heat of fusion per unit weight with a solid having a small heat of fusion per unit weight in a quantity larger than that of the former so as to equalize the total heat of fusion therebetween, the former is capable of instantaneously and locally removing a large heat of fusion as compared with the latter, thus enabling itself to more effectively remove the generated heat. That is to say, a solid having a large heat of fusion per unit weight can exert an effect on the suppression of heat generation in a quantity much less than that of a solid having a small heat of fusion per unit weight. Consequently, a heat of fusion per unit weight of a solid is preferably large as much as possible, that is, at least 190 mJ/mg. On the other hand, a solid having a small heat of fusion per unit weight must be added to the oxygen absorbent in a larger amount, thereby bringing about a marked increase in the amount of the oxygen absorption composition, and lowering its practical applicability.

However, among the solids each having a heat of fusion as determined by DSC according to JIS K7121, of 190 mJ/mg or more, a solid having an excessively low melting point melts away in the case of, for example, using the oxygen absorbent at an elevated temperature, thus unfavorably inhibiting the necessary oxygen absorbing reaction. On the contrary, a solid having an excessively high melting point is unfavorable because of difficulty in suppressing heat generation within a safe temperature range. In view of the foregoing, the melting point of the solid in question is 80 to 150° C., preferably 90 to 140° C., more preferably 100 to 130° C.

Examples of solids having a heat of fusion of at least 190 mJ/mg and a melting point in the range of 80 to 150° C. include thermoplastic resins such as polyethylene and polyoxymethylene, higher fatty acids, higher fatty acid esters and higher hydrocarbons, each of which may be used in the form of a mixture. Of these, polyethylene is preferable because of its easy availability and inexpensiveness, and in particular, it is more preferably polyethylene having a crystallinity of at least 65%. The crystallinity of polyethylene is determined by the Density method [JIS K6760 and Polyethylene, Lecture on Plastics Materials, The Nikkan Kogyo Simbun Ltd. (The Daily Industrial News)].

Polyethylene, which is a crystalline high polymer, is preferably that having a crystallinity of at least 65%, since a crystalline portion is structurally more stable than a non-crystalline portion, and thus a higher crystallinity leads to a higher density and a large heat of fusion per unit weight. The polyethylene to be used in the present invention may be copolymerized with another monomer such as propylene and 1-butene, provided that the resultant copolymer has a heat of fusion per unit weight of at least 190 mJ/mg and a melting point in the range of 80 to 150° C.

The amount of the solid having a heat of fusion of at least 190 mJ/mg and a melting point in the range of 80 to 150° C. to be added is not always definite, but varies depending upon the heating value of the oxygen absorbent, the heat of fusion of said solid, constitution of the oxygen absorption composition when the oxygen absorbent is incorporated with an other gas absorbent and, as desired, a dehumidifying agent or a moisture conditioning agent, and the atmosphere in which the oxygen absorption composition is in service. However, the amount of said solid is usually in the range of 50 to 400 parts by weight, preferably 80 to 300 parts by weight, more preferably 100 to 200 parts by weight each based on 100 parts by weight of the principal component. The amount thereof, when being less than 50 parts by weight, is unfavorable because of limited effect on the suppression of heat generation at the time of oxygen absorption, whereas the amount thereof, when being more than 400 parts by weight, is also unfavorable because of an unreasonable increase in the amount of the oxygen absorption composition accompanied with expensiveness.

The shape and size of the aforesaid solid is not specifically limited, but is required to be brought to a state in which the solid comes in sufficient contact with the principal component and cover the surrounding thereof. In view of the foregoing, an excessively angular or large solid is unfavorable. Taking into consideration the classification and handleability when the solid is mixed with each of the components of the oxygen absorption compositon, said solid is preferably in the form of a powder or granule such as small beads with a particle diameter in the range of 3.5 to 350 mesh, preferably 5 to 200 mesh, more preferably 10 to 150 mesh.

It is possible, in the oxygen absorption composition of the present invention, to use it by mixing each of the components, that is, the oxygen absorbent, other gas absorbent, dehumidifying agent, moisture conditioning agent and solid for suppressing heat generation (heat of fusion of at least 190 mJ/mg and melting point in the range of 80 to 150° C.). It is also possible therein to use it by mixing the oxygen absorbent and the solid for suppressing heat generation and separating the other gas absorbent, dehumidifying agent and moisture conditioning agent each as a single agent.

Any of the single agents and mixture are suitably used in the form of a powder, granule, tablet, sheet or the like according to the situations. It is unfavorable to bring any of the oxygen absorbent, other gas absorbent, dehumidifying agent and moisture conditioning agent into direct contact with the material to be preserved in the vessel. Accordingly, it is usually used in the form of a package in which the absorbent or the agent is packed with an air permeable packing material composed of, for example, paper, nonwoven fabric or plastics as a base material. The oxygen absorbent may be packed in part or in whole along with any or all of the other gas absorbent, dehumidifying agent and the moisture conditioning agent, or may be individually packed. The package is not specifically limited in its form, packaging material and constitution, but may be in the form of a small bag, sheet or blister (bubble) package according to the purpose of use. In addition, it is possible as a dust-proof measure to duplicate the package by further covering the aforementioned package with a dust-proof packaging material which does not hinder the permeability of inorganic gas, organic gas and moisture nor discharge the dust generated from the package outside the duplicate package. However, in the case where a dust-proof measure is taken for the package itself, the package need not be covered with a dust-proof packaging material. It is preferable that said vessel be enhanced in gas barrier properties and made of plastics, a film bag, metal, glass or the like according to the purpose of use. With regard to a film bag as an example, it is preferable to use a material having high gas barrier properties such as a film laminated with metallic foils such as aluminium foils and laminate film which is vapor-deposited with silicon oxide or aluminium oxide. The value of the gas barrier properties of the hermetically sealed vessel having gas barrier properties is usually preferably 10 $cc/m^2 \cdot day \cdot atm$ or less expressed in terms of oxygen permeability at 25° C., 60% RH (relative humidity) and 1 $g/m^2 \cdot day$ or less expressed in terms of water vapor transmission rate at 40° C., 90% RH. At the time of preserving the articles in the vessel by hermetically sealing the vessel, the atmosphere in the vessel may be replaced with a dry inert gas such as nitrogen and argon, as the replacement with the gas preferably leads to a decrease in the use amounts of the oxygen absorbent, other gas absorbent and dehumidifying agent.

Since the oxygen absorption composition according to the present invention does not need moisture in absorbing oxygen, it is usable in every humidity atmosphere from low humidity to intermediate and high humidity. The object of preservation is not specifically limited, but is exemplified by metallic wiring materials such as wire and ribbon, ceramic bodies, various metals, plastics, paper, part items composed of cloth with metal deposited film, strings for musical instruments, printed wire board, powdery raw materials for super-hard materials, metals such as copper, silver, aluminum, nickel, tin and solder, alloys, alloy powders, oxidizable powders for sintering, magnetic materials or heat resistant raw materials, metals for general purpose, semiconductor and semiconductor part items such as lead frames, IC chips, silicon wafers, shadow masks and bear chips, electronic part items and electronic materials such as electronic circuit board, precision part items such as bearings for rotational parts and free cutting steel parts, noble metal-plated articles, ornament such as finger ring, breast pin, necklace and spectacle, ornaments for alcove such as clock, mirror and jewellery, magneto-optical part items such as magnetic tape, floppy disk and optical disk, camera, microscope, telescope lens, optical fiber glass for optical communication, precision optical part items such as a lens used for optical machinery and equipment such as a copying machine and laser printer, weapons such as a gun and rocket, aircrafts such as an airplane and helicopter, driving cars such as an automobile and combat cars, solders such as a solder paste, engines, conveyors, molds, dies, tacky tape for package and electronic parts surface mounting, adhesives, toys, biodegradable polymers, plastics, tires, tubes, hoses, belts, o-rings, gaskets, insulating cover, cushions, vibration insulators, coating materials, pharmaceuticals, rubber products for sports, resins, fibers, cloths, fur, paint, negative films, photographic articles such as color printings, moving picture films, paintings, pigments, dyes, pressed dried flowers, dried flowers, books, antique books and documents, unearthed articles from ruins such as earthenware and clay figures, unearthed wooden articles such as narrow wooden strips on which an official message is written and wood working tools, unearthed metallic articles, laver dried, seasoned and prepared for food, dried food such as coffee, peanut and rice crackers, food for general use, drugs and reagents.

As described hereinbefore, the present invention provides an oxygen absorption composition which has high oxygen absorption capacity in every preservation atmosphere from low humidity to high humidity and which is easily producible, minimized in gas generation after oxygen absorption, almost odorless, and in no need of moisture in oxygen absorption.

In the following, the present invention will be described in more detail with reference to comparative examples and working examples, which however shall not limit the present invention thereto.

EXAMPLE 1

A uniform solution was obtained by mixing 1.25 g of a butadiene oligomer in liquid form as the principle component (1,4-cis bond of 74%, number-average molecular weight of 1800 and viscosity of 650 cP) and 31 mg of manganese naphthenate (Mn content of 4% by weight). The resultant uniform solution was supported on 4 g of natural zeolite as the carrier. To the solution and carrier were added 0.5 g of crushed activated carbon and 4 g of magnesium oxide, and the resultant mixture was packed in a small bag made of air-permeable packaging material (paper/perforated polyethylene having inside dimensions of 50 mm by 100 mm). Subsequently, the small bag was sealed on the periphery thereof to produce a package.

The package thus produced along with 500 milliliter (mL) of air having 60% RH (relative humidity) at 25° C. was sealed up in a plastic bag laminated with an aluminum foil (dimensions of 220 mm by 300 mm) (hereinafter referred to as "Al bag").

The resultant Al bag was preserved in an atmosphere of 60% RH at 25° C., a deoxidization time (period of time required for attaining a concentration of oxygen in the system of 0.1% or lower) was measured and the chemical composition of the gas inside the Al bag after the deoxidization was analyzed. The results are given in Table 1.

EXAMPLE 2

The procedure in Example 1 was repeated except that the principal component was altered to a butadiene oligomer in liquid form (1,4-trans bond of 60%, a number-average molecular weight of 1,200 and a viscosity of 2,000 cP). The results are given in Table 1.

EXAMPLE 3

The procedure in Example 1 was repeated except that the principal component was altered to a butadiene oligomer in liquid form (1,4-cis bond of 80%, a number-average molecular weight of 3,000 and a viscosity of 2,500 cP). The results are given in Table 1.

EXAMPLE 4

The procedure in Example 1 was repeated except that the addition of the crushed activated carbon was omitted. The results are given in Table 1.

EXAMPLE 5

The procedure in Example 3 was repeated except that the addition of the crushed activated carbon was omitted. The results are given in Table 1.

COMPARATIVE EXAMPLE 1

The procedure in Example 1 was repeated except that the principal component was altered to a butadiene oligomer in liquid form (1,2-bond of 89%, a number-average molecular weight of 1,100 and a viscosity of 6,000 cP). The results are given in Table 2.

COMPARATIVE EXAMPLE 2

The procedure in Example 1 was repeated except that the principal component was altered to an isoprene oligomer in liquid form (a number-average molecular weight of 13,000 and a viscosity of 13,000 cP). The results are given in Table 2.

COMPARATIVE EXAMPLE 3

The procedure in Example 1 was repeated except that the principal component was altered to a butadiene oligomer in liquid form (1,4-trans bond of 60%, a number-average molecular weight of 2,800 and a viscosity of 8,000 cP). The results are given in Table 2.

COMPARATIVE EXAMPLE 4

The procedure in Comparative Example 1 was repeated except that the addition of the crushed activated carbon was omitted. The results are given in Table 2.

COMPARATIVE EXAMPLE 5

The procedure in Comparative Example 2 was repeated except that the addition of the crushed activated carbon was omitted. The results are given in Table 2.

COMPARATIVE EXAMPLE 6

The procedure in Example 1 was repeated except that there were used an isoprene oligomer in liquid form as the principal component (a number-average molecular weight of 13,000 and a viscosity of 13,000 cP) together with soybean oil as a diluent at a ratio of 40/60 by weight. The results are given in Table 2.

COMPARATIVE EXAMPLE 7

The procedure in Comparative Example 6 was repeated except that the addition of the crushed activated carbon was omitted. The results are given in Table 2.

EXAMPLE 6

The procedure in Example 1 was repeated except that tall oil fatty acid manganese (manganese content of 4% by weight) was used in place of manganese naphthenate. The results are given in Table 3.

EXAMPLE 7

The procedure in Example 1 was repeated except that cobalt naphthenate (cobalt content of 4% by weight) was used in place of manganese naphthenate. The results are given in Table 3.

EXAMPLE 8

The procedure in Example 1 was repeated except that molecular sieve 13 X was used in place of natural zeolite. The results are given in Table 3.

EXAMPLE 9

The procedure in Example 1 was repeated except that iron oleate (iron content of 5.9% by weight) was used in place of manganese naphthenate, and diatomaceous earth was used in place of natural zeolite. The results are given in Table 3.

EXAMPLE 10

The procedure in Example 1 was repeated except that manganese naphthenate (manganese content of 4% by weight) was used in an amount of 155 mg instead of 31 mg. The results are given in Table 3.

EXAMPLE 11

The procedure in Example 1 was repeated except that the crushed activated carbon was used in an amount of 4.0 g instead of 0.5 g. The results are given in Table 4.

EXAMPLE 12

The procedure in Example 1 was repeated except that powdery activated carbon was used in place of the crushed activated carbon. The results are given in Table 4.

EXAMPLE 13

The procedure in Example 1 was repeated except that molecular sieve 13 X was used in place of the crushed activated carbon. The results are given in Table 4.

EXAMPLE 14

The procedure in Example 1 was repeated except that the natural zeolite was used in an amount of 8.0 g instead of 4.0 g. The results are given in Table 4.

EXAMPLE 15

The procedure in Example 1 was repeated except that CaO was used in place of MgO. The results are given in Table 4.

EXAMPLE 16

The procedure in Example 1 was repeated except that MgO was used in an amount of 8 g instead of 4 g. The results are given in Table 4.

EXAMPLE 17

A uniform solution was prepared by mixing 1.25 g of a butadiene oligomer in liquid form as the principal component (1,2-bond of 89%, a number-average molecular weight of 1,100 and a viscosity of 6,000 cP), 3.75 g of liquid paraffin and 31 mg of manganese naphthenate (Mn content of 4% by weight). The resultant composition was supported on 11.25 g of natural zeolite as the carrier. To the solution and carrier were added 0.5 g of crushed activated carbon and 4 g of MgO. The resultant mixture was packed in a small bag made of air-permeable packaging material (paper/perforated polyethylene having inside dimensions of 100 mm by 100 mm). Then, the small bag was sealed up on the periphery thereof to produce a package.

The procedure in Example 1 was repeated to measure a deoxidization time and analyze the chemical composition of the gas inside the Al bag after the deoxidization. The results are given in Table 5.

EXAMPLE 18

The procedure in Example 17 was repeated except that isoprene oligomer in liquid form (a number-average molecular weight of 13,000 and a viscosity of 13,000 cP) was used in place of the butadiene oligomer in liquid form (1,2-bond of 89%, a number-average molecular weight of 1,100 and a viscosity of 6,000 cP). The results are given in Table 5.

EXAMPLE 19

The procedure in Example 17 was repeated except that tetradecane was used in place of liquid paraffin. The results are given in Table 5.

EXAMPLE 20

The procedure in Example 17 was repeated except that the addition of the crushed activated carbon was omitted. The results are given in Table 5.

EXAMPLE 21

The procedure in Example 18 was repeated except that the addition of the crushed activated carbon was omitted. The results are given in Table 5.

EXAMPLE 22

The procedure in Example 1 was repeated except that there were used the butadiene oligomer in liquid form as the principal component (1,2-bond of 89%, a number-average molecular weight of 1,100 and a viscosity of 6,000 cP) together with tetradecane as a diluent at a ratio by weight of 60/40. The results are given in Table 5.

EXAMPLE 23

The procedure in Example 1 was repeated except that there were used the butadiene oligomer in liquid form as the principal component (1,2-bond of 89%, a number-average molecular weight of 1,100 and a viscosity of 6,000 cP) together with tetradecane as a diluent at a ratio by weight of 88/12. The results are given in Table 5.

EXAMPLE 24

The procedure in Example 1 was repeated except that 1 g of slaked lime was used in place of 4 g of MgO, and to the oxygen absorption composition was added 10 g of a moisture conditioning agent which was prepared by impregnating absorbent cotton with 10 g of a moisture conditioning solution (glycerol/water ratio of 80/20). The results are given in Table 6.

EXAMPLE 25

The procedure in Example 1 was repeated except that 1 g of slaked lime was used in place of 4 g of MgO, and to the oxygen absorption composition was added a moisture conditioning agent (10 sheets of copying paper). The results are given in Table 6.

EXAMPLE 26

The procedure in Example 1 was repeated except that 3.4 g of water was placed in the AL bag. The results are given in Table 6.

TABLE 1

| Testing Example | Example 1 | Example 2 | Example 3 | Example 4 | Example 5 |
|---|---|---|---|---|---|
| Principal component | LBO | LBO | LBO | LBO | LBO |
| Structure of principal component | | | | | |
| 1,2-(%) | 1 | 20 | 1 | 1 | 1 |
| 1,4-cis (%) | 74 | 20 | 80 | 74 | 80 |
| 1,4-trans (%) | 25 | 60 | 19 | 25 | 19 |
| Weight of principal component (g) | 1.25 | 1.25 | 1.25 | 1.25 | 1.25 |
| Molecular weight | 1800 | 1200 | 3000 | 1800 | 3000 |
| Viscosity of principal component (cP) | 650 | 2000 | 2500 | 650 | 2500 |
| Oxygen absorption accelerating substance | manganese naphthenate | manganese naphthenate | manganese naphthenate | manganese naphthenate | manganese naphthenate |
| Weight of oxygen absorption accelerating substance (mg) | 31 | 31 | 31 | 31 | 31 |
| Carrier | natural zeolite | natural zeolite | natural zeolite | natural zeolite | natural zeolite |
| Weight of carrier (g) | 4 | 4 | 4 | 4 | 4 |
| Other gas absorbent | crushed activated carbon | crushed activated carbon | crushed activated carbon | none | none |
| Weight of other gas absorbent (g) | 0.5 | 0.5 | 0.5 | | |
| Dehumidifying agent | MgO | MgO | MgO | MgO | MgO |
| Weight of dehumidifying agent (g) | 4 | 4 | 4 | 4 | 4 |
| Time required for deoxidation (days) | 1 | 5 | 5 | 1 | 5 |
| Analysis of gas in the system after deoxidization | | | | | |
| $O_2$ (%) | 0.04 | 0.08 | 0.03 | 0.06 | 0.03 |
| CO (%) | 0.17 | 0.2 | 0.14 | 0.2 | 0.15 |
| $CO_2$ (%) | n.d. | 0.15 | n.d. | 0.06 | n.d. |
| $H_2$ (%) | 0.06 | 0.1 | 0.04 | 0.05 | 0.05 |
| % RH | 0.9 | 1.3 | 0.9 | 1.1 | 1.5 |
| Organic gas (ppm) | 43 | 50 | 38 | 80 | 40 |
| Odor in gas barrier bag | odorless | odorless | odorless | somewhat rubbery odor | somewhat rubbery odor |
| Easiness of preparation | easy | somewhat difficult | somewhat difficult | easy | somewhat difficult |
| Remarks | | | | carrier also functioning the other gas absorbent | carrier also functioning the other gas absorbent |

Note
1) LBO: liquid butadiene oligomer
2) Analysis of gas in the system after deoxidization: measured after 7 days as a general rule. In the case of more than 7 days required up to deoxidization, analysis was made on the day of the end of deoxidizaton.

TABLE 2-1

| Testing Example | Comparative Example 1 | Comparative Example 2 | Comparative Example 3 | Comparative Example 4 |
|---|---|---|---|---|
| Principal component | LBO | LIO | LBO | LBO |
| Structure of principal component | | | | |
| 1,2-(%) | 89 | | 20 | 89 |
| 1,4-cis (%) | 0 | | 20 | 0 |
| 1,4-trans (%) | 11 | | 60 | 11 |
| Weight of liquid oligomer | 1.25 | 1.25 | 1.25 | 1.25 |
| Molecular weight | 1100 | 13000 | 2800 | 1100 |
| Diluent | none | none | none | none |
| Weight of diluent | | | | |
| Viscosity of principal component (cP) | 6000 | 13000 | 8000 | 6000 |
| Oxygen absorption accelerating substance | manganese naphthenate | manganese naphthenate | manganese naphthenate | manganese naphthenate |
| Weight of oxygen absorption accelerating substance (mg) | 31 | 31 | 31 | 31 |

TABLE 2-1-continued

| Testing Example | Comparative Example 1 | Comparative Example 2 | Comparative Example 3 | Comparative Example 4 |
|---|---|---|---|---|
| Carrier | natural zeolite | natural zeolite | natural zeolite | natural zeolite |
| Weight of carrier (g) | 4 | 4 | 4 | 4 |
| Other gas absorbent | crushed activated carbon | crushed activated carbon | crushed activated carbon | none |
| Weight of other gas absorbent (g) | 0.5 | 0.5 | | |
| Dehumidifying agent | MgO | MgO | MgO | MgO |
| Weight of dehumidifying agent (g) | 4 | 4 | 4 | 4 |
| Time required for deoxidation (days) | 10 | 15 | 13 | 10 |
| Analysis of gas in the system after deoxidization | | | | |
| $O_2$ (%) | 0.06 | 0.07 | 0.04 | 0.04 |
| CO (%) | 0.32 | 0.30 | 0.35 | 0.39 |
| $CO_2$ (%) | 0.29 | 0.45 | 0.20 | 0.36 |
| $H_2$ (%) | 0.15 | 0.11 | 0.15 | 0.19 |
| % RH | 1.1 | 1 | 1.3 | 1.5 |
| Organic gas (ppm) | 130 | 430 | 80 | 150 |
| Odor in gas barrier bag | odorless | odorless | odorless | somewhat rubbery odor |
| Easiness of preparation | difficult | difficult | difficult | difficult |
| Remarks | | | | carrier also functioning as the other gas absorbent |

Note
1) LIO: liquid isoprene oligomer

TABLE 2-2

| Testing Example | Comparative Example 5 | Comparative Example 6 | Comparative Example 7 |
|---|---|---|---|
| Principal component | LIO | LIO | LIO |
| Structure of principal component | | | |
| 1,2-(%) | | | |
| 1,4-cis (%) | | | |
| 1,4-trans (%) | | | |
| Weight of liquid oligomer (g) | 1.25 | 0.5 | 0.5 |
| Molecular weight | 13000 | 13000 | 13000 |
| Diluent | none | soybean oil | soybean oil |
| Weight of diluent (g) | | 0.75 | 0.75 |
| Viscosity of principal component (cP) | 13000 | 500 | 500 |
| Oxygen absorption accelerating substance | manganese naphthenate | manganese naphthenate | manganese naphthenate |
| Weight of oxygen absorption accelerating substance (mg) | 31 | 31 | 31 |
| Carrier | natural zeolite | natural zeolite | natural zeolite |
| Weight of carrier (g) | 4 | 4 | 4 |
| Other gas absorbent | none | crushed activated carbon | none |
| Weight of other gas absorbent (g) | | 0.5 | |
| Dehumidifying agent | MgO | MgO | MgO |
| Weight of dehumidifying agent (g) | 4 | 4 | 4 |
| Time required for deoxidation (days) | 15 | 2 | 2 |
| Analysis of gas in the system after deoxidization | | | |
| $O_2$ (%) | 0.06 | 0.04 | 0.04 |
| CO (%) | 0.34 | 0.90 | 1.02 |
| $CO_2$ (%) | 0.48 | 0.55 | 0.60 |
| $H_2$ (%) | 0.16 | 0.09 | 0.08 |
| % RH | 1 | 1.4 | 1.5 |
| Organic gas (ppm) | 650 | 600 | 1400 |
| Odor in gas barrier bag | somewhat rubbery odor | putrefied oil odor | putrefied oil odor |
| Easiness of preparation | difficult | easy | easy |
| Remarks | | | carrier also functioning as the other gas absorbent |

Note
1) LIO: liquid isoprene oligomer

TABLE 3-1

| Testing Example | Example 1 | Example 6 | Example 7 |
|---|---|---|---|
| Principal component | LBO | LBO | LBO |
| Structure of principal component | | | |
| 1,2-(%) | 1 | 1 | 1 |
| 1,4-cis (%) | 74 | 74 | 74 |
| 1,4-trans (%) | 25 | 25 | 25 |
| Weight of principal component (g) | 1.25 | 1.25 | 1.25 |
| Molecular weight | 1800 | 1800 | 1800 |
| Viscosity of principal component (cP) | 650 | 650 | 650 |
| Oxygen absorption | manganese | manganese | cobalt |

TABLE 3-1-continued

| Testing Example | Example 1 | Example 6 | Example 7 |
|---|---|---|---|
| accelerating substance | naphthenate | talloil fatty acid | naphthenate |
| Weight of oxygen absorption accelerating substance (mg) | 31 | 31 | 31 |
| Carrier | natural zeolite | natural zeolite | natural zeolite |
| Weight of carrier (g) | 4 | 4 | 4 |
| Other gas absorbent | crushed activated carbon | crushed activated carbon | crushed activated carbon |
| Weight of other gas absorbent (g) | 0.5 | 0.5 | 0.5 |
| Dehumidifying agent | MgO | Mgo | MgO |
| Weight of dehumidifying agent (g) | 4 | 4 | 4 |
| Time required for deoxidation (days) | 1 | 1 | 2 |
| Analysis of gas in the system after deoxidization | | | |
| $O_2$ (%) | 0.04 | 0.03 | 0.04 |
| CO (%) | 0.17 | 0.18 | 0.16 |
| $CO_2$ (%) | n.d. | n.d. | 0.07 |
| $H_2$ (%) | 0.06 | 0.05 | 0.08 |
| % RH | 0.9 | 1.7 | 1.4 |
| Organic gas (ppm) | 43 | 41 | 41 |
| Odor in gas barrier bag | odorless | odorless | odorless |
| Easiness of preparation | easy | easy | easy |

TABLE 3-2

| Testing Example | Example 8 | Example 9 | Example 10 |
|---|---|---|---|
| Principal component | LBO | LBO | LBO |
| Structure of principal component | | | |
| 1,2-(%) | 1 | 1 | 1 |
| 1,4-cis (%) | 74 | 74 | 74 |
| 1,4-trans (%) | 25 | 25 | 25 |
| Weight of principal component (g) | 1.25 | 1.25 | 1.25 |
| Molecular weight | 1800 | 1800 | 1800 |
| Viscosity of principal component (cP) | 650 | 650 | 650 |
| Oxygen absorption accelerating substance | manganese naphthenate | iron oleate | manganese naphthenate |
| Weight of oxygen absorption accelerating substance (mg) | 31 | 31 | 155 |
| Carrier | M. S. 13X | diatomaceous earth | natural zeolite |
| Weight of carrier (g) | 4 | 4 | 4 |
| Other gas absorbent | crushed activated carbon | crushed activated carbon | crushed activated carbon |
| Weight of other gas absorbent (g) | 0.5 | 0.5 | 0.5 |
| Dehumidifying agent | MgO | MgO | MgO |
| Weight of dehumidifying agent (g) | 4 | 4 | 4 |
| Time required for deoxidation (days) | 4 | 4 | 1 |
| Analysis of gas in the system after deoxidization | | | |
| $O_2$ (%) | 0.03 | 0.03 | 0.05 |
| CO (%) | 0.2 | 0.22 | 0.3 |
| $CO_2$ (%) | n.d. | 0.05 | 0.06 |
| $H_2$ (%) | 0.12 | 0.15 | 0.05 |
| % RH | 1.1 | 1.5 | 1.4 |
| Organic gas (ppm) | 53 | 130 | 140 |

TABLE 3-2-continued

| Testing Example | Example 8 | Example 9 | Example 10 |
|---|---|---|---|
| Odor in gas barrier bag | odorless | somewhat rubbery odor | odorless |
| Easiness of preparation | easy | easy | easy |

TABLE 4-1

| Testing Example | Example 11 | Example 12 | Example 13 |
|---|---|---|---|
| Principal component | LBO | LBO | LBO |
| Structure of principal component | | | |
| 1,2-(%) | 1 | 1 | 1 |
| 1,4-cis (%) | 74 | 74 | 74 |
| 1,4-trans (%) | 25 | 25 | 25 |
| Weight of principal component (g) | 1.25 | 1.25 | 1.25 |
| Molecular weight | 1800 | 1800 | 1800 |
| Viscosity of principal component (cP) | 650 | 650 | 650 |
| Oxygen absorption accelerating substance | manganese naphthenate | manganese naphthenate | manganese naphthenate |
| Weight of oxygen absorption accelerating substance (mg) | 31 | 31 | 31 |
| Carrier | natural zeolite | natural zeolite | natural zeolite |
| Weight of carrier (g) | 4 | 4 | 4 |
| Other gas absorbent | crushed activated carbon | powdery activated carbon | M. S. 13X |
| Weight of other gas absorbent (g) | 4 | 0.5 | 0.5 |
| Dehumidifying agent | MgO | MgO | MgO |
| Weight of dehumidifying agent (g) | 4 | 4 | 4 |
| Time required for deoxidation (days) | 1 | 1 | 1 |
| Analysis of gas in the system after deoxidization | | | |
| $O_2$ (%) | 0.03 | 0.03 | 0.08 |
| CO (%) | 0.12 | 0.19 | 0.16 |
| $CO_2$ (%) | n.d. | n.d. | n.d. |
| $H_2$ (%) | 0.04 | 0.07 | 0.06 |
| % RH | 1.7 | 1.2 | 1.5 |
| Organic gas (ppm) | 30 | 50 | 62 |
| Odor in gas barrier bag | odorless | odorless | odorless |
| Easiness of preparation | easy | easy | easy |

Note:
M. S. 13X—molecular sieve 13X

TABLE 4-2

| Testing Example | Example 14 | Example 15 | Example 16 |
|---|---|---|---|
| Principal component | LBO | LBO | LBO |
| Structure of principal component | | | |
| 1,2-(%) | 1 | 1 | 1 |
| 1,4-cis (%) | 74 | 74 | 74 |
| 1,4-trans (%) | 25 | 25 | 25 |
| Weight of principal component (g) | 1.25 | 1.25 | 1.25 |
| Molecular weight | 1800 | 1800 | 1800 |
| Viscosity of principal component (cP) | 650 | 650 | 650 |
| Oxygen absorption | manganese | manganese | manganese |

TABLE 4-2-continued

| Testing Example | Example 14 | Example 15 | Example 16 |
|---|---|---|---|
| accelerating substance | naphthenate | naphthenate | naphthenate |
| Weight of oxygen absorption accelerating substance (mg) | 31 | 31 | 31 |
| Carrier | natural zeolite | natural zeolite | natural zeolite |
| Weight of carrier (g) | 8 | 4 | 4 |
| Other gas absorbent | crushed activated carbon | crushed activated carbon | crushed activated carbon |
| Weight of other gas absorbent (g) | 0.5 | 0.5 | 0.5 |
| Dehumidifying agent | MgO | CaO | MgO |
| Weight of dehumidifying agent (g) | 4 | 4 | 8 |
| Time required for deoxidation (days) | 1 | 1 | 1 |
| Analysis of gas in the system after deoxidization | | | |
| $O_2$ (%) | 0.04 | 0.04 | 0.04 |
| CO (%) | 0.15 | 0.17 | 0.16 |
| $CO_2$ (%) | n.d. | n.d. | n.d. |
| $H_2$ (%) | 0.09 | 0.06 | 0.06 |
| % RH | 1.2 | 1.2 | 1.2 |
| Organic gas (ppm) | 35 | 43 | 40 |
| Odor in gas barrier bag | odorless | odorless | odorless |
| Easiness of preparation | easy | easy | easy |

Note:
M. S. 13X—molecular sieve 13X

TABLE 5-1

| Testing Example | Example 17 | Example 18 | Example 19 | Example 20 |
|---|---|---|---|---|
| Liquid oligomer | LBO | LIO | LBO | LBO |
| Structure of oligomer | | | | |
| 1,2-(%) | 89 | | 89 | 89 |
| 1,4-cis (%) | 0 | | 0 | 0 |
| 1,4-trans (%) | 11 | | 11 | 11 |
| Viscosity of liquid oligomer (cP) | 6000 | 13000 | 6000 | 6000 |
| Weight of liquid oligomer (g) | 1.25 | 1.25 | 1.25 | 1.25 |
| Diluent | liquid paraffin | liquid paraffin | tetradecane | liquid paraffin |
| Weight of diluent (g) | 3.75 | 3.75 | 3.75 | 3.75 |
| Viscosity of principal component (cP) | 300 | 500 | 30 | 300 |
| Oxygen absorption accelerating substance | manganese naphthenate | manganese naphthenate | manganese naphthenate | manganese naphthenate |
| Weight of oxygen absorption accelerating substance (mg) | 31 | 31 | 31 | 31 |
| Carrier | natural zeolite | natural zeolite | natural zeolite | natural zeolite |
| Weight of carrier (g) | 11.25 | 11.25 | 11.25 | 11.25 |
| Other gas absorbent | crushed activated carbon | crushed activated carbon | crushed activated carbon | none |
| Weight of other gas absorbent (g) | 0.5 | 0.5 | 0.5 | |
| Dehumidifying agent | MgO | MgO | MgO | MgO |
| Weight of dehumidifying agent (g) | 4 | 4 | 4 | 4 |
| Time required for deoxidation (days) | 3 | 3 | 3 | 3 |
| Analysis of gas in the system after deoxidization | | | | |
| $O_2$ (%) | 0.06 | 0.06 | 0.06 | 0.06 |
| CO (%) | 0.3 | 0.31 | 0.35 | 0.33 |
| $CO_2$ (%) | 0.3 | 0.4 | 0.3 | 0.34 |
| $H_2$ (%) | 0.18 | 0.09 | 0.16 | 0.15 |
| % RH | 1.5 | 1.5 | 1.1 | 1.3 |
| Organic gas (ppm) | 120 | 450 | 120 | 135 |
| Odor in gas barrier bag | odorless | odorless | odorless | somewhat rubbery odor |
| Easiness of preparation | easy | easy | easy | easy |

TABLE 5-1-continued

| Testing Example | Example 17 | Example 18 | Example 19 | Example 20 |
|---|---|---|---|---|
| Remarks | | | | carrier also functioning as the other gas absorbent |

TABLE 5-2

| Testing Example | Example 21 | Example 22 | Example 23 |
|---|---|---|---|
| Liquid oligomer | LIO | LBO | LBO |
| Structure of oligomer | | | |
| 1,2-(%) | | 89 | 89 |
| 1,4-cis (%) | | 0 | 0 |
| 1,4-trans (%) | | 11 | 11 |
| Viscosity of liquid oligomer (cP) | 13000 | 6000 | 6000 |
| Weight of liquid oligomer (g) | 1.25 | 0.75 | 1.1 |
| Diluent | liquid paraffin | tetradecane | tetradecane |
| Weight of diluent (g) | 3.75 | 0.5 | 0.15 |
| Viscosity of principal component (cP) | 500 | 50 | 800 |
| Oxygen absorption accelerating substance | manganese naphthenate | manganese naphthenate | manganese naphthenate |
| Weight of oxygen absorption accelerating substance (mg) | 31 | 31 | 31 |
| Carrier | natural zeolite | natural zeolite | natural zeolite |
| Weight of carrier (g) | 11.25 | 4 | 4 |
| Other gas absorbent | none | crushed activated carbon | crushed activated carbon |
| Weight of other gas absorbent (g) | | 0.5 | 0.5 |
| Dehumidifying agent | MgO | MgO | MgO |
| Weight of dehumidifying agent (g) | 4 | 4 | 4 |
| Time required for deoxidation (days) | 3 | 3 | 6 |
| Analysis of gas in the system after deoxidization | | | |
| $O_2$ (%) | 0.06 | 0.07 | 0.05 |
| CO (%) | 0.31 | 0.31 | 0.36 |
| $CO_2$ (%) | 0.41 | 0.28 | 0.3 |
| $H_2$ (%) | 0.12 | 0.14 | 0.14 |
| % RH | 1.2 | 1.1 | 1.1 |
| Organic gas (ppm) | 700 | 100 | 130 |
| Odor in gas barrier bag | somewhat rubbery odor | odorless | odorless |
| Easiness of preparation | easy | easy | easy |
| Remarks | carrier also functioning as the other gas absorbent | | |

TABLE 6

| Testing Example | Example 1 | Example 24 | Example 25 | Example 26 |
|---|---|---|---|---|
| Oxygen absorption composition | | | | |
| Principal component | LBO | LBO | LBO | LBO |
| Structure of oligomer | | | | |
| 1,2-(%) | 1 | 1 | 1 | 1 |
| 1,4-cis (%) | 74 | 74 | 74 | 74 |
| 1,4-trans (%) | 25 | 25 | 25 | 25 |
| Weight of principal component (g) | 1.25 | 1.25 | 1.25 | 1.25 |
| Molecular weight | 1800 | 1800 | 1800 | 1800 |
| Viscosity of principal component (cP) | 650 | 650 | 650 | 650 |
| Oxygen absorption accelerating substance | manganese naphthenate | manganese naphthenate | manganese naphthenate | manganese naphthenate |
| Weight of oxygen absorption accelerating substance (mg) | 31 | 31 | 31 | 31 |
| Carrier | natural zeolite | natural zeolite | natural zeolite | natural zeolite |
| Weight of carrier (g) | 4 | 4 | 4 | 4 |
| Other gas absorbent | | | | |
| Crushed activated carbon (g) | 0.5 | 0.5 | 0.5 | 0.5 |
| Slaked lime (g) | none | 1 | 1 | 1 |
| Dehumidifying agent | | | | |
| Weight of MgO (g) | 4 | none | none | 4 |
| Water added (g) | none | none | none | 3.4 |
| Moisture conditioning agent | none | 10 g | 10-sheets | none |
| Time required for deoxidation (days) | 1 | 1 | 1 | 1 |

TABLE 6-continued

| Testing Example | Example 1 | Example 24 | Example 25 | Example 26 |
|---|---|---|---|---|
| Analysis of gas in the system after deoxidization | | | | |
| $O_2$ (%) | 0.04 | 0.05 | 0.04 | 0.07 |
| CO (%) | 0.17 | 0.16 | 0.17 | 0.18 |
| $CO_2$ (%) | n.d. | 0.05 | 0.08 | n.d. |
| $H_2$ | 0.06 | 0.06 | 0.05 | 0.07 |
| % RH | 0.9 | 51 | 70 | 100 |
| Organic gas (ppm) | 43 | 52 | 60 | 66 |
| Odor in gas barrier bag | odorless | odorless | odorless | odorless |
| Easiness of preparation | easy | easy | easy | easy |

The following examples are those in which polyethylene was compounded to suppress heat generation. In the calculation of polyethylene crystallinity, there were used a density of the perfect crystal of 1.000 g/cm$^3$ and a density of the perfect non-crystal of 0.856 g/cm$^3$.

A measurement was made at room temperature, of the exothermic temperature of the composition under ventilating heat insulation condition in the following manner. A cylindrical stainless-steel wire mesh cage (30 cm in diameter, 15 cm in height and 0.5 cm in wire mesh opening) was covered inside with absorbent cotton of about 2 cm in thickness. Then 100 pieces of oxygen absorption composition packages were placed inside the absorbent cotton, and the top of the cage was covered therewith in the same manner. A thermocouple was inserted from the top to the middle of the cage to measure the maximum temperature.

The measurement was made, at an ambient constant temperature of 140° C., of the exothermic temperature of the composition in accordance with "Testing method for evaluating the risk of substances and description of judgement criteria" IMDG CODE (International Maritime Dangerous Goods Code). Specifically, into a cubical top-opened cage with a side length of 10 cm made of stainless-steel wire mesh (0.053 mm mesh) was placed a powdery article to be tested up to the top line of the cage. A thermocouple was inserted into the cage to the middle of the powdery article to be tested (middle of the cage), then the cage was suspended in a dryer at a constant temperature of 140° C. for 24 hours, and a measurement was made of the maximum temperature. The article which showed a marked rise in temperature exceeding 200° C. was marked as "Over 200° C."

EXAMPLE 27

A uniform solution was obtained by mixing 125 parts by weight of the butadiene oligomer in liquid form in the same manner as that in Example 1, and 3.1 part by weight of a tall oil fatty acid cobalt. The resultant uniform solution was impregnated into 375 parts by weight of natural zeolite and supported thereon. To the resultant mixture was added under mixing, 150 parts by weight of high density polyethylene having a heat of fusion (by DSC) of 268 mJ/mg, a melting point (by DSC) of 128° C., a crystallinity of 74%, an average molecular weight of 4,000 and a particle size distribution of 20 to 150 mesh. Thereafter to the resultant mixture were added 100 parts by weight of activated carbon as an other gas absorbent, and 10 parts by weight of a mixed solution of glycerol/water at a ratio by weight of 80/20 as the moisture conditioning agent to prepare an oxygen absorbent composition. Subsequently the composition thus obtained was packed in a small bag made of air-permeable packaging material (paper/perforated polyethylene having inside dimensions of 50 mm by 100 mm). Then the small bag was sealed up on the periphery thereof to prepare a packaged oxygen absorption composition. Thus, a measurement was made of the exothermic temperature of each of 100 pieces of the resultant packaged oxygen absorption composition under ventilating heat insulation at 25° C. As a result, the maximum temperature was suppressed to 74° C. and no discoloration was recognized in the external appearance of the package. On the other hand, a measurement was made of the exothermic temperature of the oxygen absorption composition without packaging the same at a constant ambient temperature of 140° C. As a result, the maximum temperature was 144° C.

EXAMPLE 28

The procedure in Example 27 was repeated except that 400 parts by weight of calcium oxide as the dehumidifying agent was used in place of the mixed solution of glycerol/water as the moisture conditioning agent. As a result, the maximum exothermic temperature of the packaged oxygen absorption composition under ventilating heat insulation condition at 25° C. was suppressed to 75° C., and the maximum exothermic temperature of the same at a constant temperature of 140° C. was 116° C.

What is claimed is:

1. An oxygen absorption composition which does not require moisture for oxygen absorption, which comprises:
    (a) a first gas absorbent which is an oxygen absorbent comprising, as a principal component, a butadiene oligomer in liquid form having a number-average molecular weight of 150 to 4,000 and a viscosity of 100 to 4,000 cP, said oligomer having at least 65% 1,4-cis bonding in the molecular structure thereof,
    (b) an oxygen absorption-accelerating substance,
    (c) a carrier, said oligomer and said substance being supported on said carrier; and
    (d) a second gas absorbent.

2. The oxygen absorption composition according to claim 1 wherein said composition further comprises a solid which has a heat of fusion of at least 190 mJ/mg and a melting point in the range of 80 to 150° C.

3. The oxygen absorption composition according to claim 2, wherein said solid is a polyethylene having a crystallinity of at least 65%.

4. The oxygen absorption composition according to claim 1, wherein said composition further comprises a dehumidifying agent.

5. The oxygen absorption composition according to claim 4, wherein said composition further comprises a solid which has a heat of fusion of at least 190 mJ/mg and a melting point in the range of 80 to 150° C.

6. The oxygen absorption composition according to claim 5, wherein said solid is a polyethylene having a crystallinity of at least 65%.

7. The oxygen absorption composition according to claim 1, wherein said composition further comprises a moisture conditioning agent.

8. The oxygen absorption composition according to claim 7, wherein said composition further comprises a solid which has a heat of fusion of at least 190 mJ/mg and a melting point in the range of 80 to 150° C.

9. The oxygen absorption composition according to claim 8, wherein said solid is a polyethylene having a crystallinity of at least 65%.

10. The oxygen absorption composition according to claim 1, wherein the oxygen absorption-accelerating substance is in an amount of 0.01 to 40 parts by weight based on 100 parts by weight of the oligomer; the carrier is in an amount of 1 to 1,000 parts by weight based on 100 parts by weight of the oligomer; the second gas absorbent is in an amount of 1 to 5,000 parts by weight based on 100 parts by weight of the oligomer; the number-average molecular weight is 300 to 3,000; and the viscosity is 150 to 2,000 cP.

11. The oxygen absorption composition according to claim 10, wherein the number-average molecular weight is 500 to 2,500 and the viscosity is 200 to 2,000 cP.

12. The oxygen-absorption composition according to claim 11, wherein the oxygen absorption-accelerating substance is selected from the group consisting of (a) a salt of a transition metal selected from the group consisting of Cu, Fe, Co, Ni, Cr and Mn, said salt being selected from the group consisting of a sulfate, a chloride, a nitrate, a fatty acid salt, an acetylacetone metal salt and an alkyl-metal salt, and (b) a radical initiator selected from the group consisting of a catechol, 2,2-azobis(isobutyronitrile) and benzoyl peroxide; the carrier is selected from the group consisting of paper, nonwoven fabric, silica-gel, alumina, activated carbon, a zeolite, perlite, activated clay and diatomaceous earth; and the second gas absorbent is selected from the group consisting of aluminum oxide, a zeolite, perlite, activated clay, silica-gel, activated carbon, molecular sieving carbon, bone charcoal, calcium oxide, barium oxide, magnesium oxide, sodium hydroxide, potassium hydroxide, slaked lime, magnesium silicate, aluminum silicate, sodium sulfate, sodium carbonate, potassium carbonate, soda lime, Ascarite, an organic acid salt and an organic amine.

13. An oxygen absorption composition which does not require moisture for oxygen absorption, which comprises:

(a) a first gas absorbent which is an oxygen absorbent comprising, as a principal component, a butadiene oligomer in liquid form, said oligomer having at least 65% 1,4-cis bonding in the molecular structure thereof, said oligomer being incorporated with an oxygen-unabsorptive diluent to adjust the viscosity of the resultant mixture to 10 to 4,000 cP, (b) an oxygen absorption-accelerating substance, (c) a carrier, said oligomer and said substance being supported on said carrier; and (d) a second gas absorbent.

14. The oxygen absorption composition according to claim 13, wherein said composition further comprises a solid which has a heat of fusion of at least 190 mJ/mg and a melting point in the range of 80 to 150° C.

15. The oxygen absorption composition according to claim 14, wherein said solid is a polyethylene having a crystallinity of at least 65%.

16. The oxygen absorption composition according to claim 13, wherein said composition further comprises a dehumidifying agent.

17. The oxygen absorption composition according to claim 16, wherein said composition further comprises a solid which has a heat of fusion of at least 190 mJ/mg and a melting point in the range of 80 to 150° C.

18. The oxygen absorption composition according to claim 17, wherein said solid is a polyethylene having a crystallinity of at least 65%.

19. The oxygen absorption composition according to claim 13, wherein said composition further comprises a moisture conditioning agent.

20. The oxygen absorption composition according to claim 19, wherein said composition further comprises a solid which has a heat of fusion of at least 190 mJ/mg and a melting point in the range of 80 to 150° C.

21. The oxygen absorption composition according to claim 20, wherein said solid is a polyethylene having a crystallinity of at least 65%.

22. The oxygen absorption composition according to claim 13, wherein the oxygen absorption-accelerating substance is in an amount of 0.01 to 40 parts by weight based on 100 parts by weight of the oligomer; the carrier is in an amount of 1 to 1,000 parts by weight based on 100 parts by weight of the oligomer; and the viscosity is 20 to 2,000 cP.

23. The oxygen absorption composition according to claim 22, wherein the viscosity is 30 to 1,000 cP.

24. The oxygen-absorption composition according to claim 23, wherein the diluent is selected from the group consisting of decane, tridecane, tetradecane, n-paraffin, an alkylnaphthene and a naphthenic acid; and the diluent is in an amount of at most 1,000 parts by weight per 100 parts by weight of the oligomer.

* * * * *